(12) United States Patent
Peiffer

(10) Patent No.: US 12,302,799 B2
(45) Date of Patent: May 20, 2025

(54) GARDEN PROTECTION SYSTEM

(71) Applicant: Nicholas Scott Peiffer, Bailey, CO (US)

(72) Inventor: Nicholas Scott Peiffer, Bailey, CO (US)

( * ) Notice: Subject to any disclaimer, the term of this patent is extended or adjusted under 35 U.S.C. 154(b) by 523 days.

(21) Appl. No.: 17/389,753

(22) Filed: Jul. 30, 2021

(65) Prior Publication Data

US 2022/0030780 A1 Feb. 3, 2022

Related U.S. Application Data

(60) Provisional application No. 63/058,979, filed on Jul. 30, 2020.

(51) Int. Cl.
*A01G 13/24* (2025.01)
*A01G 13/21* (2025.01)

(52) U.S. Cl.
CPC ............. *A01G 13/24* (2025.01); *A01G 13/21* (2025.01)

(58) Field of Classification Search
CPC . A01G 9/16; A01G 9/22; A01G 9/227; A01G 9/242; E06B 9/26; E04B 7/16; E04B 9/08; E04H 15/08; E04H 15/36; E04H 15/58; E04F 10/06; E04F 10/0603; E04F 10/0607; E04F 10/0614
USPC ............ 47/17; 135/88.11, 88.12, 88.16, 124, 135/117, 157, 136, 120.4, 132, 133, 907; 52/3, 23, 64, 66, 222, DIG. 12, DIG. 14; 160/66, 67, 72, 80, 81, 71, 243
See application file for complete search history.

(56) References Cited

U.S. PATENT DOCUMENTS

| | | | | |
|---|---|---|---|---|
| 544,871 | A * | 8/1895 | Turner | E04H 15/04 211/180 |
| 2,520,625 | A * | 8/1950 | Dean | E04F 10/02 160/57 |
| 2,785,445 | A * | 3/1957 | Phillips | E04F 10/08 49/257 |

(Continued)

FOREIGN PATENT DOCUMENTS

| | | | | |
|---|---|---|---|---|
| CA | 2647667 A1 * | 6/2010 | | E04F 10/0614 |
| EP | 0164047 A1 * | 5/1985 | | |

(Continued)

OTHER PUBLICATIONS

Merged translation of FR-2431827-A1 (Year: 1980).*

(Continued)

*Primary Examiner* — Morgan T Jordan
(74) *Attorney, Agent, or Firm* — FisherBroyles, LLP; Gregory T. Fettig

(57) ABSTRACT

A garden protection system includes a frame operable to suspend a shade cloth over a garden bed to protect underlying plants in the garden bed from inclement weather, and a housing mounted to the frame and comprising a moisture detector, a roller system, circuitry, a motor, a pulley system, a power supply, and a solar panel. The shade cloth is wrapped about the roller system, and the roller system is rotatably coupled to the pulley system. The moisture detector is operable to detect said inclement weather, and to automatically direct the motor to rotate the pulley system. And, the pulley system is operable to rotate the roller system to roll the shade cloth along a side of the garden protection system via roller brackets that are slidably affixed to the frame.

1 Claim, 18 Drawing Sheets

(56) References Cited

U.S. PATENT DOCUMENTS

| | | | | |
|---|---|---|---|---|
| 3,263,735 A * | 8/1966 | Vecchiarelli | E04F 10/08 | 160/67 |
| 3,324,869 A * | 6/1967 | Duda | E04F 10/0625 | 135/88.12 |
| 3,722,571 A * | 3/1973 | Knight | E04F 10/0662 | 135/904 |
| 3,789,903 A * | 2/1974 | Clark | E04F 10/0614 | 160/75 |
| 3,918,510 A * | 11/1975 | Hayward | B60P 3/343 | 160/68 |
| 3,918,511 A * | 11/1975 | Upton, Jr. | E04F 10/0625 | 160/67 |
| 3,923,074 A * | 12/1975 | McKee | E04F 10/0625 | 135/904 |
| 3,952,758 A * | 4/1976 | Addison | E04F 10/0603 | 135/141 |
| 4,064,648 A * | 12/1977 | Cary | A01G 9/227 | 52/DIG. 17 |
| 4,305,235 A * | 12/1981 | Roston | A01G 9/22 | 126/621 |
| 4,348,833 A * | 9/1982 | Nagoya | A01G 9/242 | 47/17 |
| 4,387,533 A * | 6/1983 | Green | A01G 9/22 | 52/63 |
| 4,555,865 A * | 12/1985 | di Monteforte | A01G 9/24 | 52/64 |
| 4,577,436 A * | 3/1986 | Dalle | A01G 9/22 | 47/17 |
| 4,672,889 A * | 6/1987 | Lynch | F24F 7/02 | 52/63 |
| 4,724,882 A * | 2/1988 | Wang | E04H 15/58 | 211/195 |
| 4,815,365 A * | 3/1989 | Dupont | A01G 9/242 | 52/64 |
| 4,858,395 A * | 8/1989 | McQuirk | E04B 1/94 | 52/63 |
| 5,038,517 A * | 8/1991 | Talbott | A01G 9/242 | 52/63 |
| 5,212,903 A * | 5/1993 | Talbott | A01G 9/242 | 239/242 |
| 5,292,169 A * | 3/1994 | O'Brian | B60J 7/085 | 160/67 |
| 5,335,447 A * | 8/1994 | Bee | A01G 9/225 | 47/17 |
| 5,564,234 A * | 10/1996 | Vermeulen | A01G 9/227 | 52/63 |
| 5,669,430 A * | 9/1997 | Malott | B60P 3/343 | 160/67 |
| 5,829,200 A * | 11/1998 | Jones | A62C 2/10 | 52/3 |
| 6,123,136 A * | 9/2000 | Williams | E04F 10/0685 | 160/67 |
| 6,260,308 B1 * | 7/2001 | Looney | A01G 9/242 | 52/63 |
| 6,260,908 B1 * | 7/2001 | Fraula | E04F 10/0625 | 160/67 |
| 6,282,834 B1 * | 9/2001 | Mossey | A01G 9/1438 | 47/17 |
| 6,324,792 B1 * | 12/2001 | DeGarie | E04B 7/10 | 52/80.1 |
| 6,341,638 B1 * | 1/2002 | Thompson | E04F 10/08 | 160/67 |
| 6,513,856 B1 * | 2/2003 | Swanson | B60J 7/085 | 296/100.15 |
| 6,752,193 B1 * | 6/2004 | Molloy | E04F 10/0651 | 160/310 |
| 6,893,071 B2 * | 5/2005 | Chabot | B60J 7/085 | 296/100.18 |
| 7,188,889 B2 * | 3/2007 | Wagner | B60P 3/343 | 135/88.11 |
| 7,814,921 B1 * | 10/2010 | Ranieri | E04F 10/0681 | 135/159 |
| 7,913,711 B2 * | 3/2011 | Milano, Jr. | E04H 15/32 | 135/117 |
| 8,132,583 B2 * | 3/2012 | Mowatt, Sr. | E04F 10/0603 | 135/117 |
| 8,397,787 B1 * | 3/2013 | Daus | E05F 15/71 | 160/1 |
| 8,413,385 B2 * | 4/2013 | Mahoney | E04H 1/1238 | 52/39 |
| 8,496,283 B1 * | 7/2013 | Schmeichel | B60J 7/085 | 296/100.16 |
| 8,695,281 B2 * | 4/2014 | Dondurur | E04D 13/1606 | 160/270 |
| 8,899,299 B2 * | 12/2014 | Stewart | E05F 5/025 | 160/199 |
| 9,212,503 B1 * | 12/2015 | Mentch | A01G 9/22 | |
| 9,241,447 B2 * | 1/2016 | Looney | A01G 9/242 | |
| 9,404,281 B1 * | 8/2016 | Donnay | E04H 15/52 | |
| 2003/0070353 A1 * | 4/2003 | Mercurio | A01G 9/242 | 47/17 |
| 2004/0035059 A1 * | 2/2004 | Meyer | A62C 3/0257 | 52/3 |
| 2011/0048651 A1 * | 3/2011 | Goth | E04F 10/0618 | 700/275 |
| 2014/0157662 A1 * | 6/2014 | Wallace | A01G 9/14 | 47/17 |
| 2015/0218807 A1 * | 8/2015 | Capati | E04B 1/36 | 52/66 |
| 2016/0262318 A1 * | 9/2016 | Lloyd | E04F 10/0614 | |
| 2017/0191273 A1 * | 7/2017 | Eilam | H02S 10/40 | |

FOREIGN PATENT DOCUMENTS

| | | | | |
|---|---|---|---|---|
| FR | 2431827 A1 * | 2/1980 | | |
| FR | 2484194 A1 * | 12/1981 | | |
| FR | 2668195 A1 * | 4/1992 | | A01G 9/242 |
| KR | 1656040 B1 * | 9/2016 | | A01G 9/222 |
| WO | WO-0060192 A1 * | 10/2000 | | A01G 9/227 |
| WO | WO-2007148976 A1 * | 12/2007 | | A01G 9/225 |
| WO | WO-2014205522 A1 * | 12/2014 | | E04F 10/06 |

OTHER PUBLICATIONS

Merged translation of FR-2484194-A1 (Year: 1981).*
Merged translation of EP0164047A1 (Year: 1985).*
Merged translation of DE9103345 (Year: 1991).*
Merged translation of FR-2668195-A1 (Year: 1992).*
Merged translation of WO-0060192-A1 (Year: 2000).*
Merged translation of WO-2007148976-A1 (Year: 2007).*
Merged translation of CA-2647667-A1 (Year: 2010).*
Merged translation of WO-2014205522-A1 (Year: 2014).*
Merged translation of KR-1656040-B1 (Year: 2016).*

* cited by examiner

GARDEN PROTECTION SYSTEM

CROSS-REFERENCE TO RELATED APPLICATIONS

This patent application claims priority to, and thus the benefit of an earlier filing date from, U.S. Provisional Patent Application No. 63/058,979 (filed Jul. 30, 2020), the contents of which are hereby incorporated by reference.

BACKGROUND

Gardens are susceptible to damage from weather, such as wind, rain, and hail. And, such weather can be unpredictable. Some people have attempted to protect their gardens with coverings during weather. However, inclement weather can arrive when people are unable to tend to their gardens. What is needed is an automatic garden protection system that shields garden beds during weather events.

SUMMARY

Systems and methods herein provide for garden protection. In one embodiment, a garden protection system includes a frame operable to suspend a shade cloth over a garden bed to protect underlying plants in the garden bed from inclement weather, and a housing mounted to the frame and comprising a moisture detector, a roller system, circuitry, a motor, a pulley system, a power supply, and a solar panel. The shade cloth is wrapped about the roller system, and the roller system is rotatably coupled to the pulley system. The moisture detector is operable to detect said inclement weather, and to automatically direct the motor to rotate the pulley system. And, the pulley system is operable to rotate the roller system to roll the shade cloth along a side of the garden protection system via roller brackets that are slidably affixed to the frame.

In another embodiment, a method includes detecting inclement weather with a moisture detector configured with a housing of a garden protection system, automatically directing a motor to rotate a pulley system in response to the inclement weather detection, and rotating a roller system responsive to rotating the pulley system to roll a shade cloth along a frame of the garden protection system. The frame is operable to suspend the shade cloth over a garden bed to protect underlying plants in the garden bed from the inclement weather. The housing is mounted to the frame and comprises the moisture detector, the roller system, circuitry, the motor, the pulley system, a power supply, and a solar panel. The shade cloth is wrapped about the roller system, and the roller system is rotatably coupled to the pulley system. And, the shade cloth is affixed to roller brackets that are slidably affixed to the frame.

BRIEF DESCRIPTION OF THE DRAWINGS

Some embodiments of the present invention are now described, by way of example only, and with reference to the accompanying drawings.

DETAILED DESCRIPTION OF THE EMBODIMENTS

Figure 1:
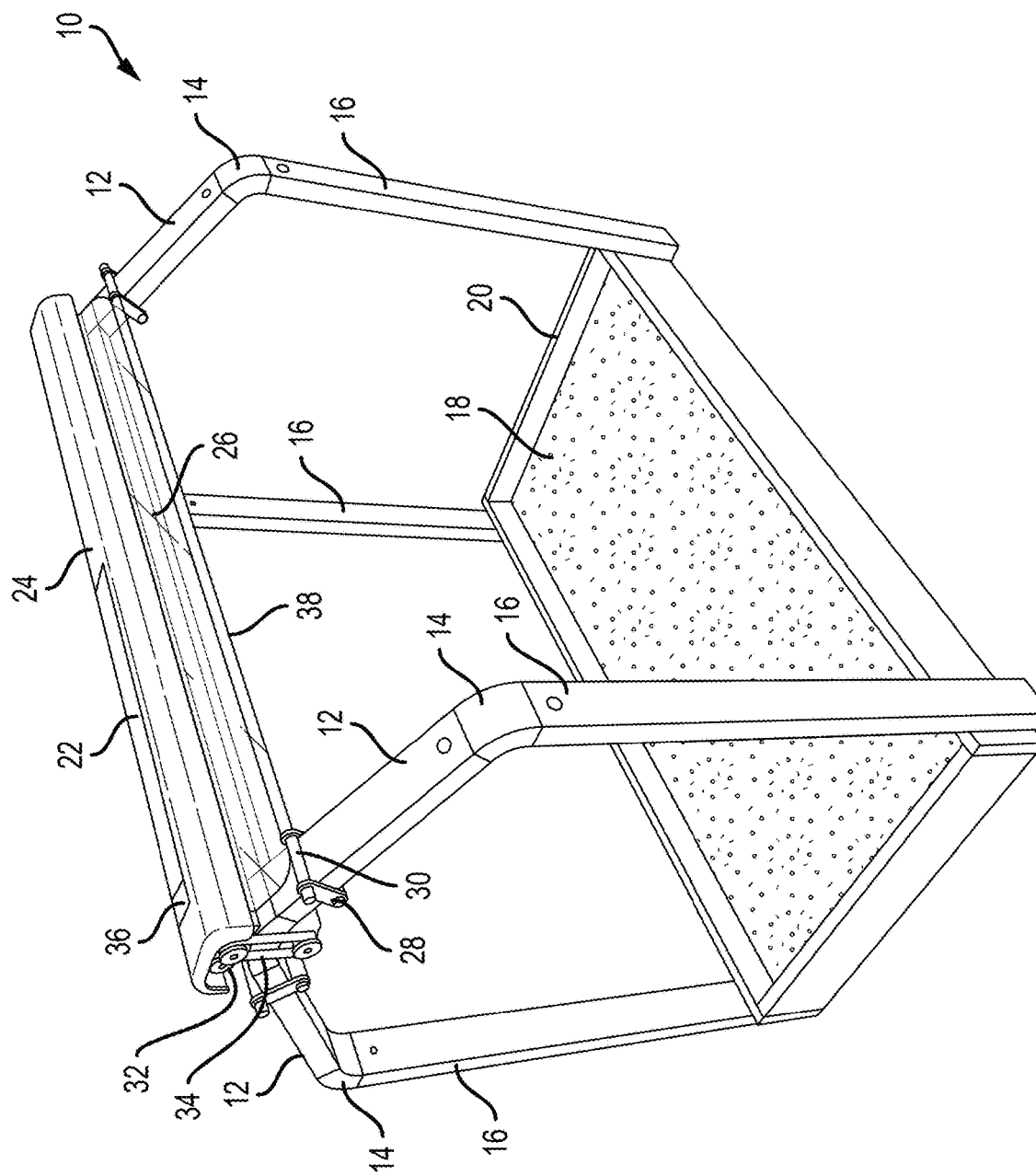
FIG. 1 is a perspective view of a garden protection system, in one exemplary embodiment.
Figure 2:
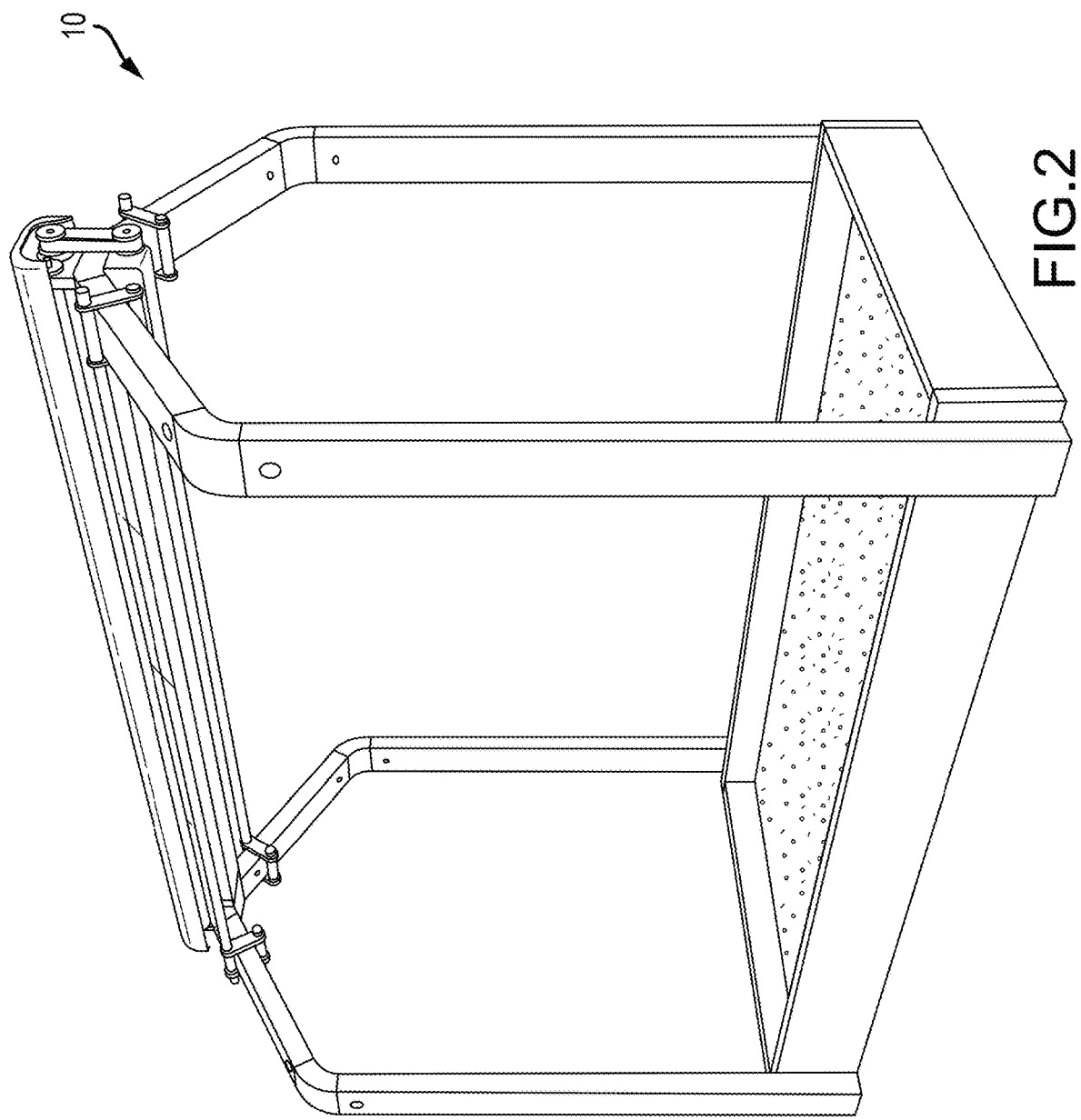
FIG. 2 is another perspective view of the garden protection system, in one exemplary embodiment.
Figure 3:
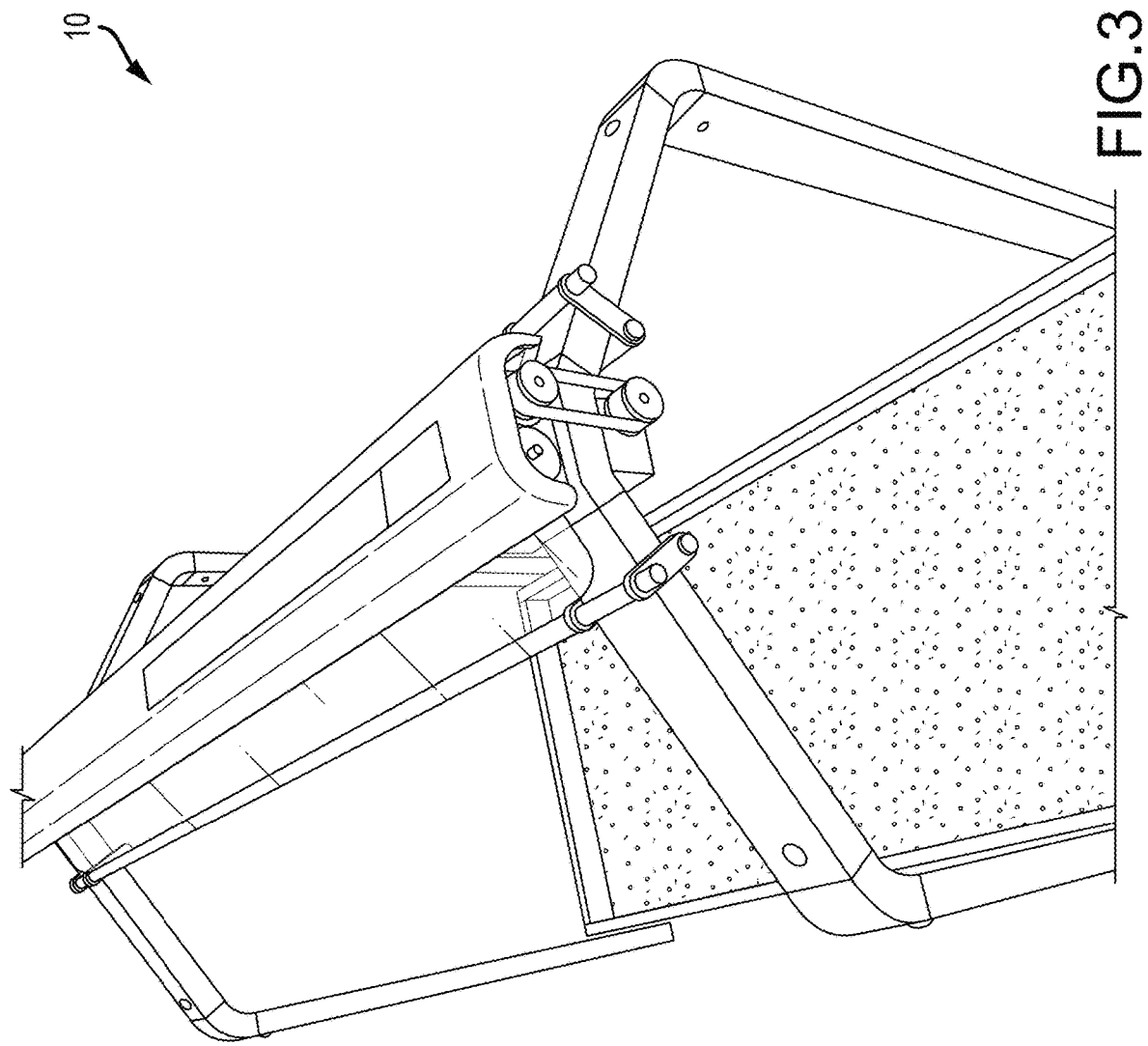
FIG. 3 is an overhead view of the garden protection system, in one exemplary embodiment.
Figure 4:
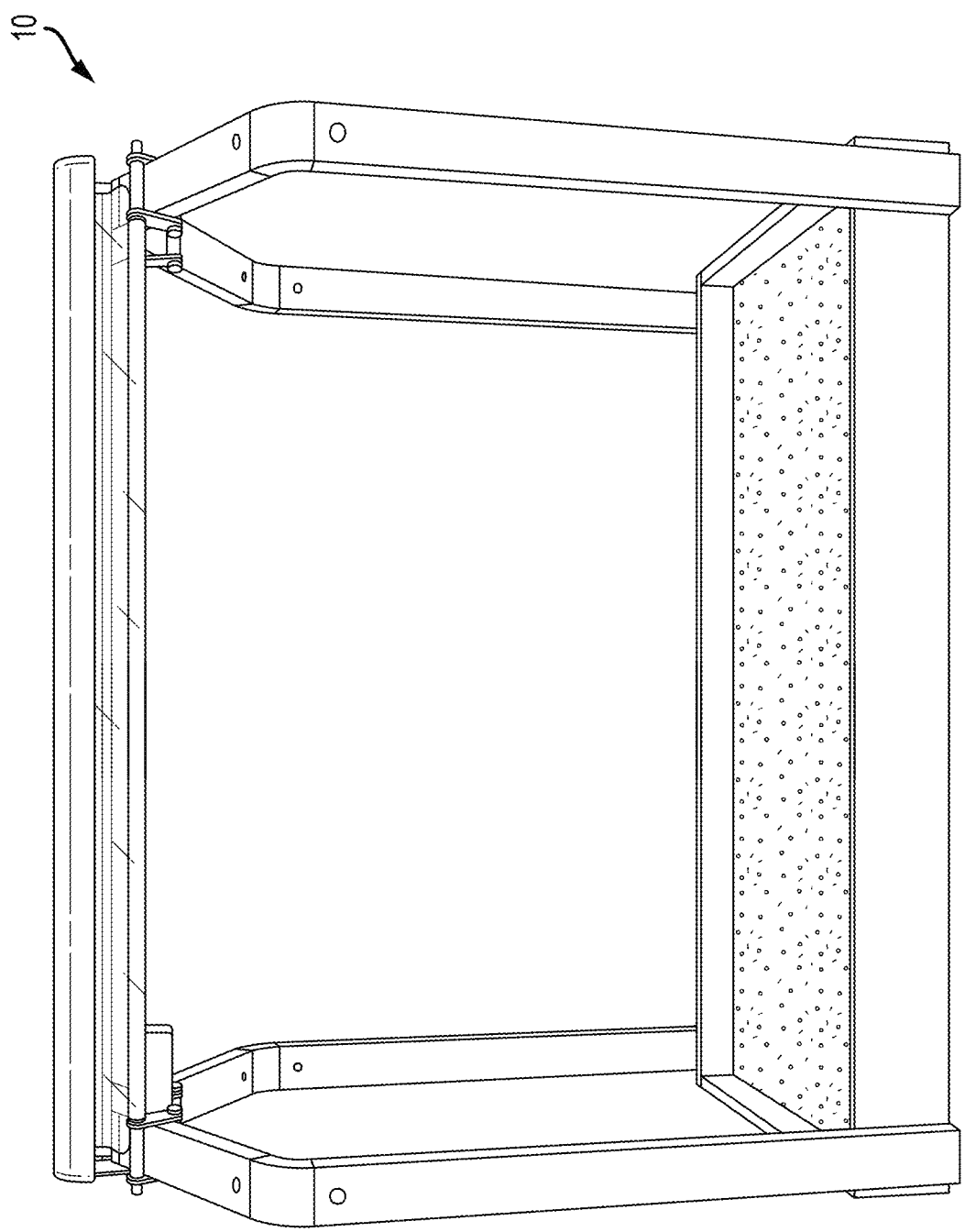
FIG. 4 is a side view of the garden protection system, in one exemplary embodiment.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

FIGS. 1-6 illustrate various views of a garden protection system 10, in one exemplary embodiment. In this embodiment, the garden protection system 10 comprises rigid legs 16 (e.g., hollow aluminum) that may be bolted to roofing members 12 at joints 14. The legs 16 are operable to bolt to sides of a garden box 20 which comprises a raised garden bed 18. Alternatively or additionally, the legs 16 may comprise feet that may be mounted to a surface (e.g., the ground) via holes that accept stakes for securing to the surface.

Mounted to the top of the garden protection system 10 where the roofing members 12 connect is a housing 24 that is operable to provide environmental protection to underlying components, such as the pulley system 34, a roller system 32, a motor (not shown), various electronics and circuitry (not shown), a battery system (not shown), etc. Configured with the housing 24 is a solar panel 22 which is operable to provide power to the battery system and thus the electronics and the motor.

In other embodiments, the legs 16, joints 14, and roofing members 12 at each end of the garden protection system 10 are formed as a single unit or using fewer or more rigid parts. In whatever the configuration, these "frames" provide support for the housing 24 and the various components thereof. In some embodiments, the height of the frames may be changeable so as to adapt for the garden bed 18 to grow varying size plants.

Figure 5:
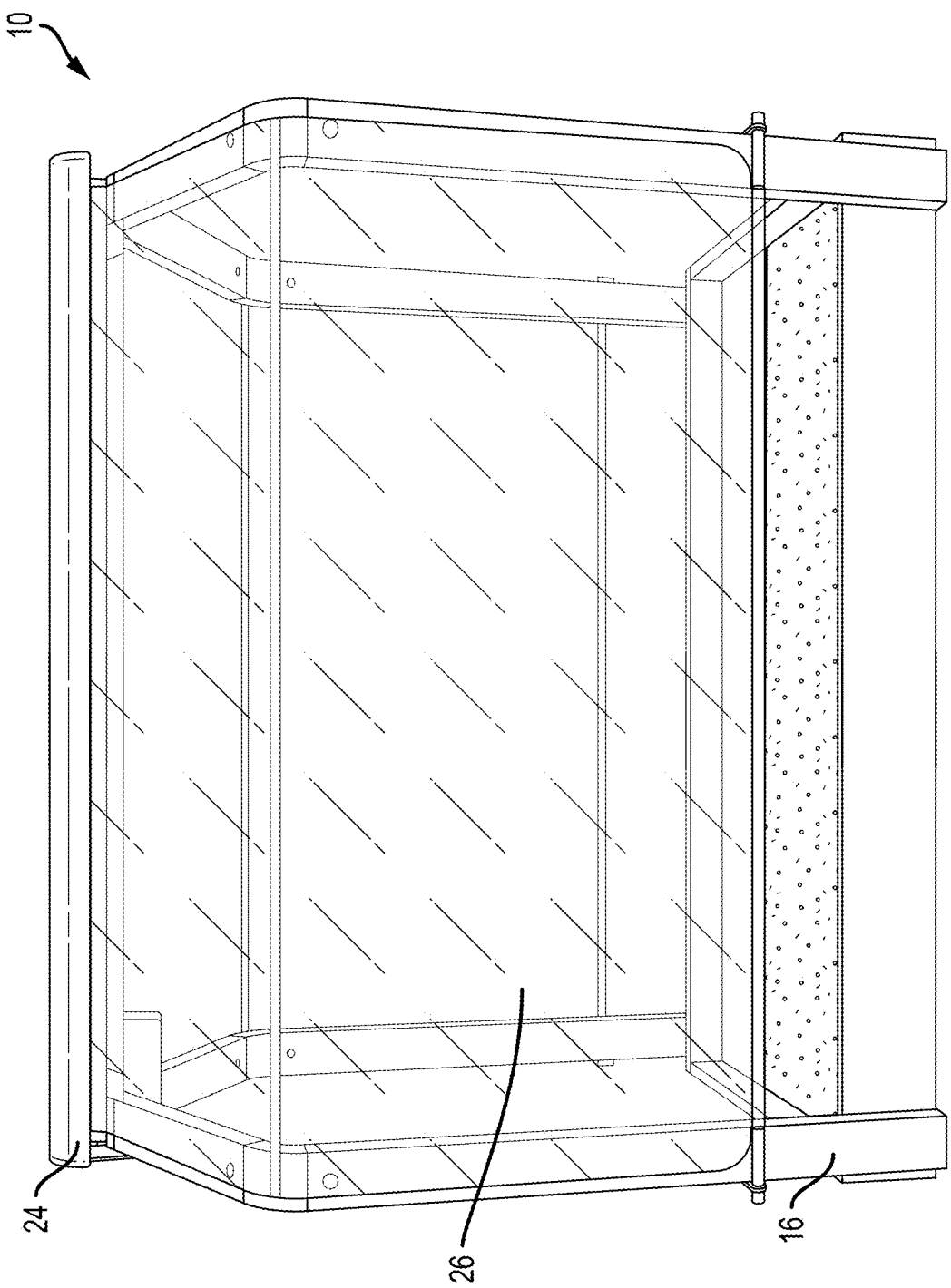
FIG. 5 is another side view of the garden protection system with the shade cloths rolled out, in one exemplary embodiment.
Figure 6:
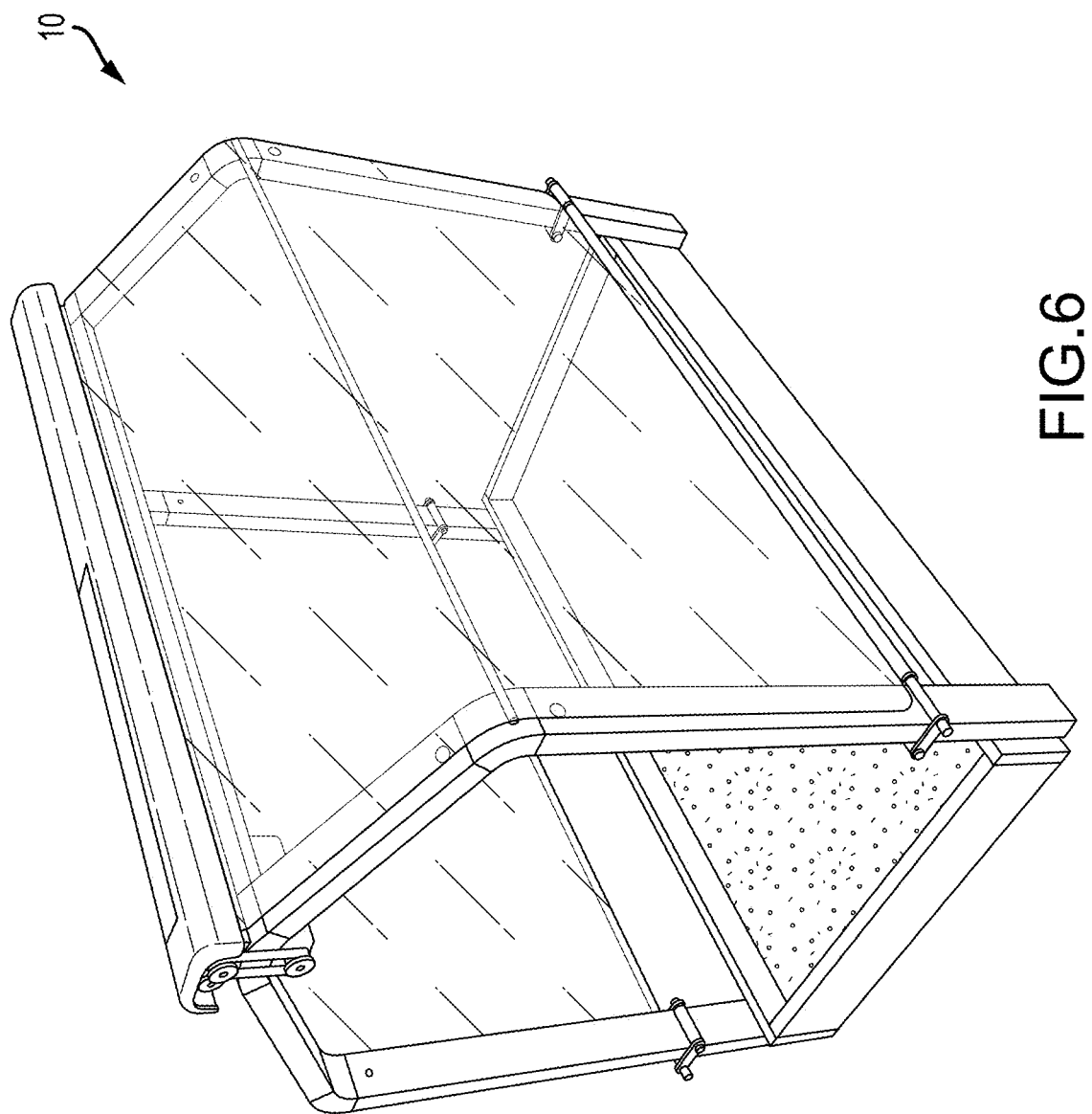
FIG. 6 is a perspective view of the garden protection system with the shade cloths rolled out, in one exemplary embodiment.

One or more rolls of a shade cloth 26 (e.g., a mesh material) may be rolled onto the roller system 32 so as to slide the shade cloth 26 along the roofing members 12 and down the legs 16 so as to protect the garden bed 18 during periods of inclement weather (e.g., hail, extreme sun, heat, torrential rain, wind etc.). For example, a bracket 28 may be configured with rollers 30. And, each bracket 28 may be dimensioned about each roofing member 12, joint 14, and leg 16 and configured with at least one roller 30 slidably affixed to the frame. Thus, when the roller system 32 is activated within the housing 24, the shade cloth 26 rolls down from the top of the garden protection system 10 along the roofing members 12, the joints 14, and the legs 16. The combined weight of the brackets 28, the rollers 30, and the shade cloth 26 may provide enough "pull" such that when the roller system 32 unrolls the shade cloth 26, the shade cloth 26 rolls down along the sides of the garden protection system 10 (e.g., via gravitational force limited by the amount of turns of the roller system 32, the pulley system 34, and the motor), as illustrated in FIGS. 5 and 6. In some embodiments, the motor and the roller system 32 may only partially enclose the garden protection system 10 (e.g., so as to provide shade garden box 20 and the garden bed 18 therein).

In some embodiments, the shade cloth 26 may be configured with a retention rod 38 that is operable to retain the shape of the shade cloth 26 such that it rolls along the legs 16, joints 14, and the roofing members 12 in a controlled manner. The retention rod 38 may also prevent sagging that could compromise the shade cloth 26 and cause damage to the underlying garden bed 18 during heavy rain and/or hail. In this regard, the shade cloth 26 may have a sewn pocket through which the retention rod 38 slides to mechanically couple to the brackets 28 on one side of the frame.

Also configured with the housing 24 is a moisture detector 36 that is operable to detect excessive moisture from rain and/or hail. For example, when excessive moisture is detected by the moisture detector 36, the motor within the housing 24 may automatically activate to turn the pulley system 34, and thus the roller system 32, to automatically roll the shade cloth 26 along the sides of the garden protection system 10, as illustrated in FIGS. 5 and 6.

In one embodiment, the shade cloth 26 is a woven material that is selectively chosen depending on the amount of sunlight and/or water desired on the garden bed 18. In this regard, the shade cloth 26 may be at least partially transparent yet configured to limit the amount of moisture into the garden bed 18 while preventing hail and/or winds from damaging plants therein. In one embodiment, the shade cloth 26 is wrapped around a roll tube of the roller system 32, and at the end of the roll tube is the pulley system 34 that is coupled to the motor and is operable to rotate the roll tube such that the shade cloth 26 may be lowered and retracted. Generally, the garden protection system 10 is configured with two such roll tubes so as to roll a shade cloth 26 along each side of the garden protection system 10. These roll tubes may be configured to roll the shade cloth 26 down both sides of the garden protection system 10 at the same time to cover the garden bed 18. Alternatively, the roll tubes may be configured to roll independently so as to provide shade for the garden bed 18 for different times of the day as the sun changes position. In some embodiments, the electronics may detect the sun's changing position and automatically deploy all or a portion of the shade cloth 26 (e.g., via an amount of solar energy being detected and/or temperature sensors). Other embodiments may include gears that are affixed to the motor and to the roller system 32 to roll out the shade cloth 26.

The roller system 32 may be configured under the housing 24 so to protect the shade cloth 26 from sun and other weather conditions when the shade cloth 26 is not deployed, as such may shorten the lifespan of the shade cloth 26. The housing 24 may also protect against birds and other animals chewing and tearing holes in the shade cloth 26 that would allow for large hail stones and excessive water into the garden bed 18.

In one embodiment, when water (e.g., rain and/or hail) makes a connection with the moisture detector 36, the moisture detector 36 directs the motor to unroll the shade cloth 26 and cover the garden bed 18. And, when the moisture detector 36 dries (e.g., when the rain and/or hail stops), the moisture detector 36 may automatically engage the motor to retract the shade cloth 36 by turning the roll tubes in the opposite direction. The moisture detector 36 may be flush mounted into the housing 24. In some embodiments, moisture detector 36 may include a glass screen similar to that of a smart phone touch screen interface that is operable to detect moisture and configured to be more durable to weather.

Figure 7:
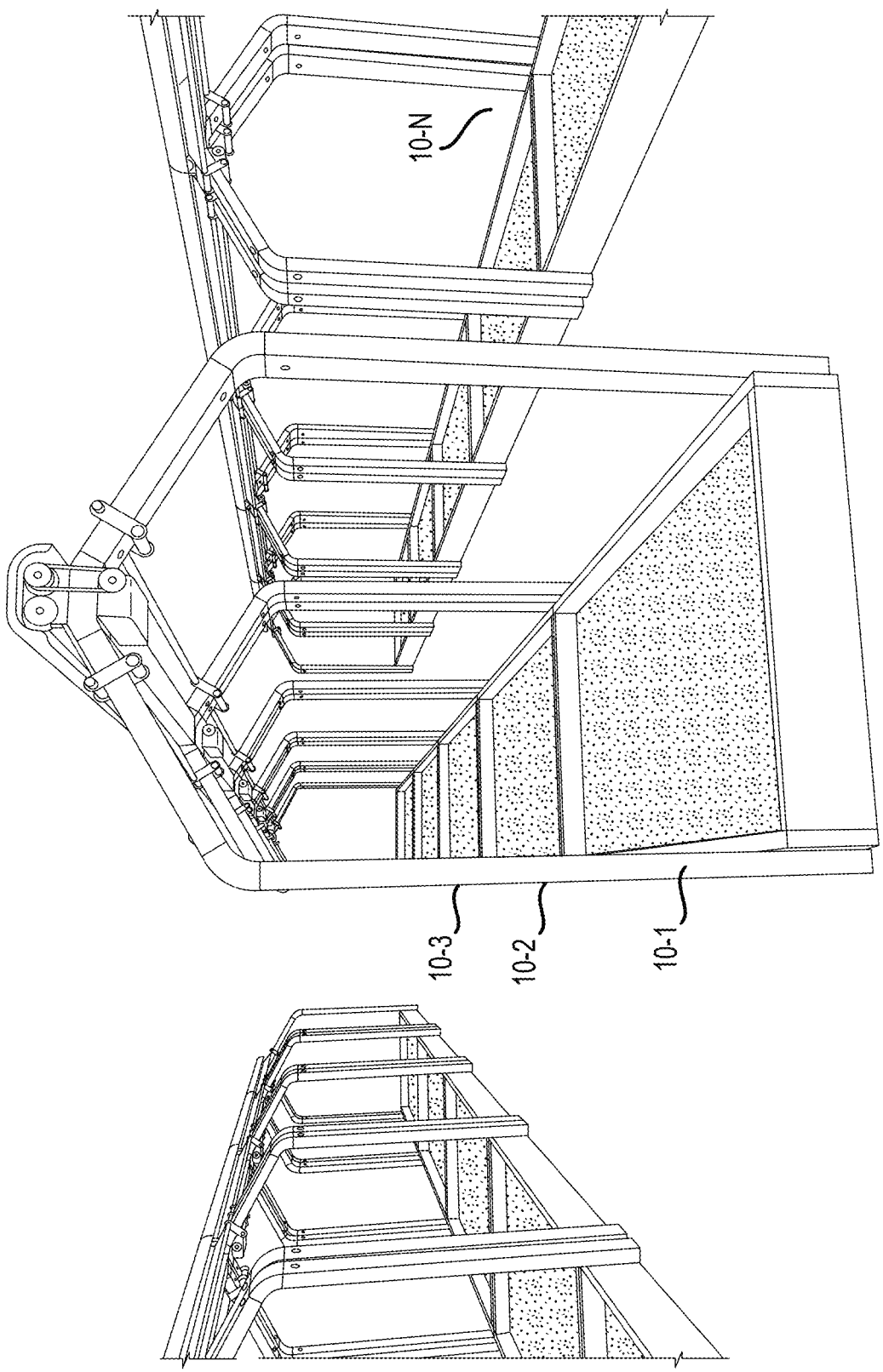
FIG. 7 is a perspective view of a plurality of garden protection systems interconnected, in one exemplary embodiment.
Figure 8:
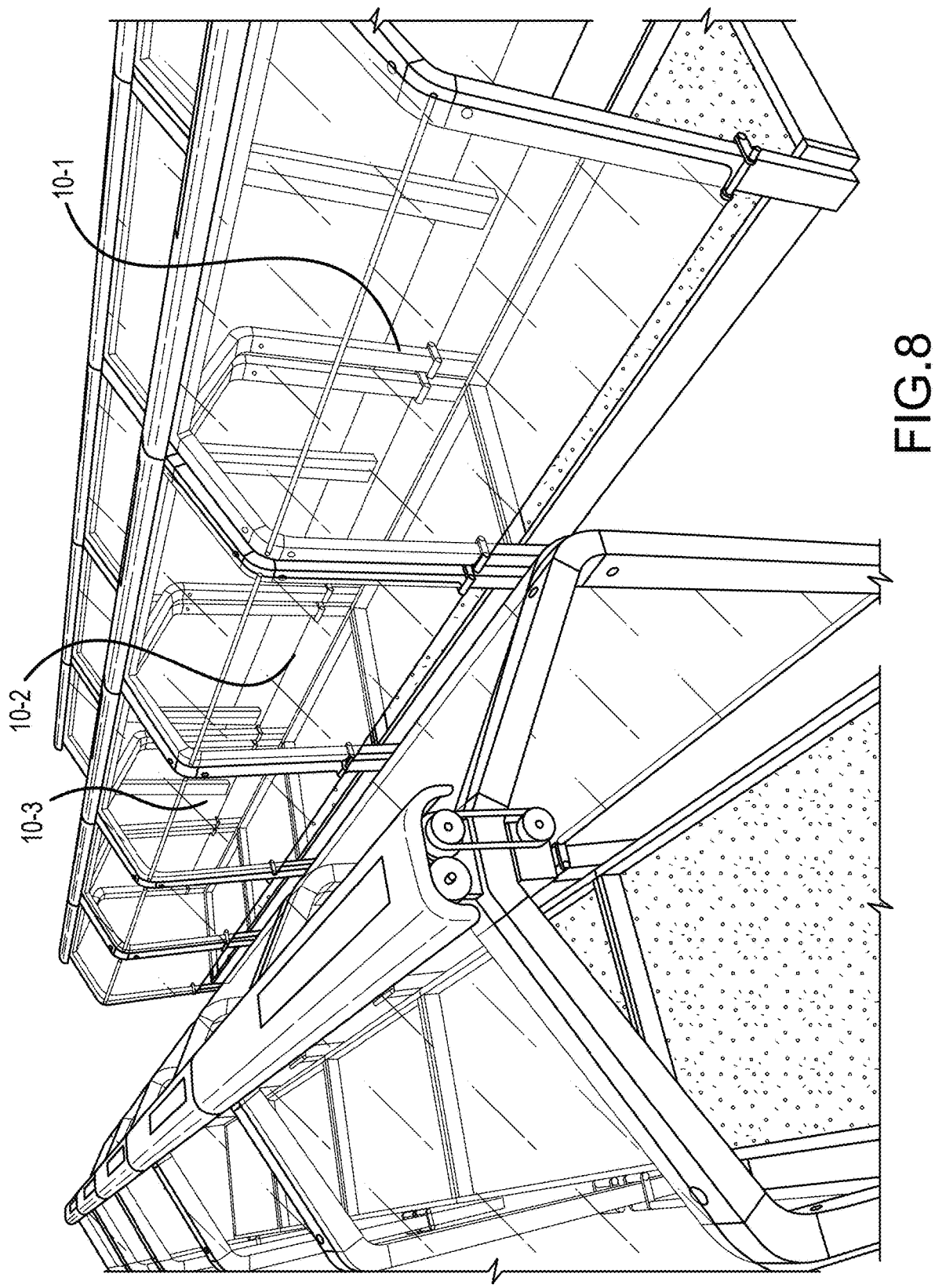
FIG. 8 is a perspective view of a plurality of garden protection systems interconnected with the shade cloths rolled out, in one exemplary embodiment.

The solar panel 22 may be configured with the garden protection system 10 to charge batteries (not shown) that power the motor. The batteries may be located in the housing 24 along with the motor and any circuitry required to activate the motor In some embodiments, the garden protection system 10 can be configured as a modular system, as illustrated in FIGS. 7 and 8 (e.g., garden protection systems 10-1, 10-2, 10-3, . . . , 10-N, where the reference "N" merely indicates an integer greater than "1"). For example, a person may wish to have a series of garden boxes 20. The embodiments herein may be adapted for sheltering each garden box 20 independently. In this regard, the garden protection systems 10 may be independently controlled based on an amount of rain and/or sunshine the underlying plants may require. For example, corn is generally a hardier plant than flowers. Thus, one garden box 20 planted with corn may be configured with a garden protection system 10 that is configured to allow more sunshine and rain than an adjacent garden box 20.

In some embodiments, the moisture detector 36 may be configured to measure an amount of moisture via analog output pins so that one can determine when a threshold of moisture is exceeded. The moisture detector 36 may include an electronics module and a printed circuit board (PCB) that "collects" the raindrops. Thus, as raindrops are collected on the circuit board, the raindrops can create paths of parallel resistance that are measured via an operational amplifier (e.g., an LM393 op-amp). In this regard, more water may lower the resistance and lower the voltage output. Conversely, less water may increase the resistance and increase the output voltage on the analog pin. In one embodiment, a completely dry board may, for example, cause the moisture detector 36 to output about five volts to activate the motor. However, the embodiment is not intended to be limited to any particular voltage output.

In some embodiments, the solar panel 22 converts the solar radiation into electricity and/or heat (e.g., via the photovoltaic effect) and may include cells that are arranged in a grid-like pattern on the surface of the solar panel 22. Thus, it may also be described as a set of photovoltaic modules, mounted on a structure supporting it.

In one embodiment, the motor is a 12 volt motor and is capable of rolling and unrolling the shade cloth off a 12 volt DC (direct current) battery. However, any suitable power source and motor may be used. Exemplary DC motors include shunt-wound motors, step motor, series-wound motors, compound-wound motors, and permanent magnet motors. DC motors may be used and configured to operate at a fixed speed for a fixed voltage with little to no slip. In some embodiments, the motor is an AC (alternating current) motor to which is supplied by an external AC power source. In other embodiments, the AC power source is operable AC to the battery as a charger to the battery. In this regard, the various circuitries may also include an AC to DC converter. In some embodiments, the AC power source is operable as a battery backup if the battery fails to hold a charge and/or drops below a certain level that allows for the deployment of the shade cloth 26.

In some embodiments, the rollers 30 have bearings and are configured to be similarly dimensioned to the frames (e.g., the roofing members 12, joints 14, and legs 16) of the garden protection system 10 so as to keep the shade cloth 26 attached to the frames and "on track" to smoothly roll up and down when activated. When the shade cloth 26 is down, the rollers 30 may be configured to hold the shade cloth 26 in times of inclement weather and to shelter plants in the garden bed 18.

Figure 9:
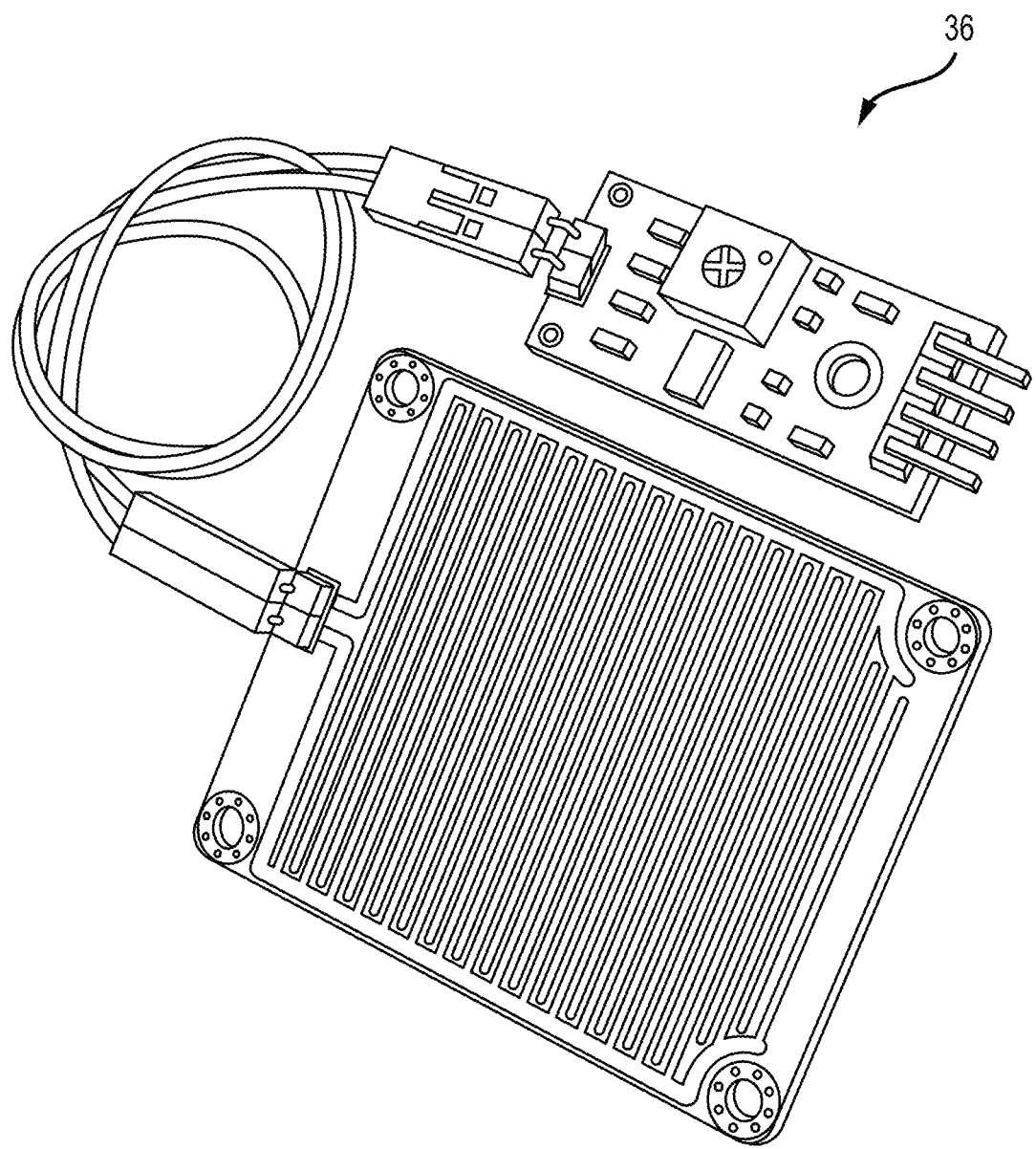
FIG. 9 is a moisture detector and its associated circuitry, in one exemplary embodiment.

FIG. 9 is an exemplary diagram of a moisture detector 36 and its associated circuitry, in one exemplary embodiment. As mentioned, associated circuitry may be configured within the housing 24 so as to protect circuitry from the environment.

Figure 10:
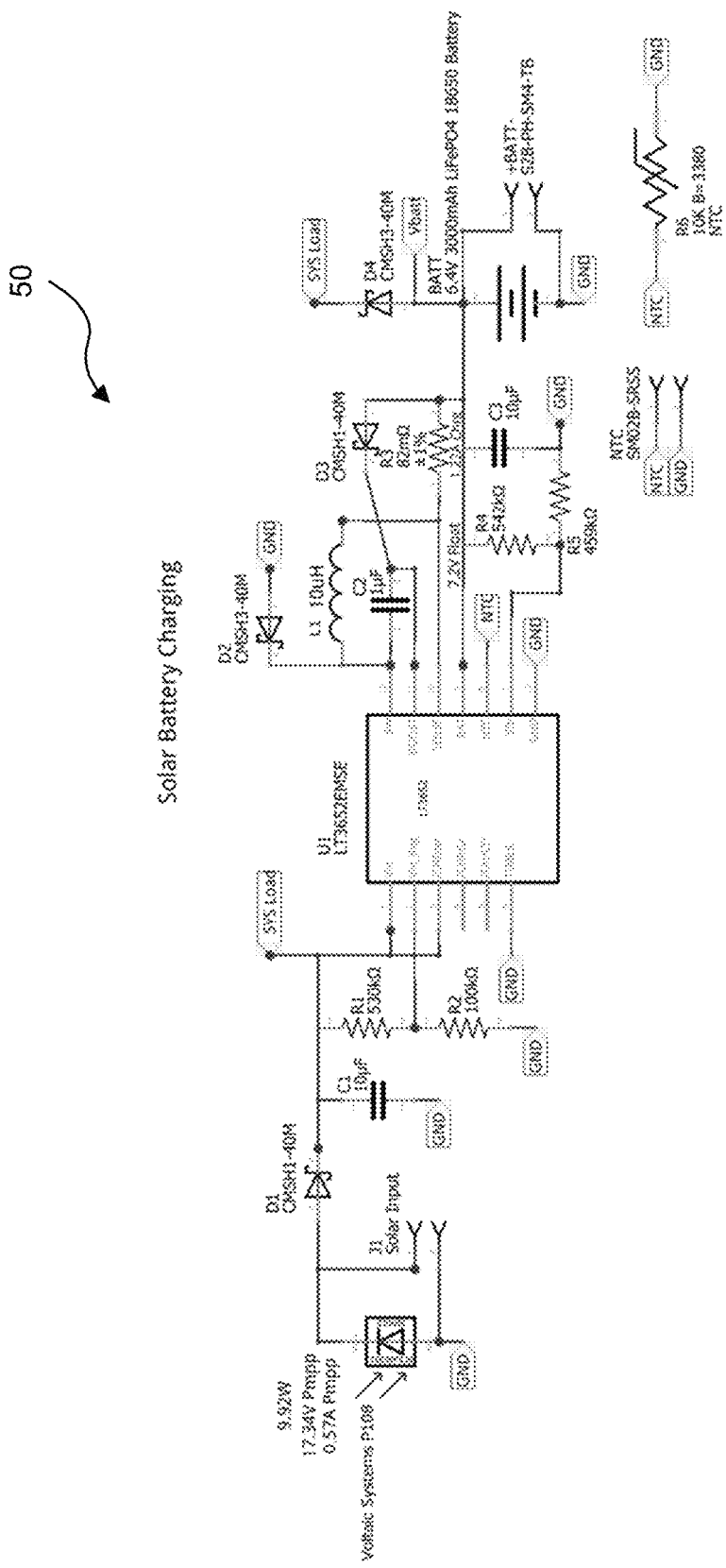
FIG. 10 is a circuit diagram of a solar powered battery charging system for the garden protection system, in one exemplary embodiment.

FIG. 10 is an exemplary circuit diagram of a solar powered battery charging system 50.

Figure 12:
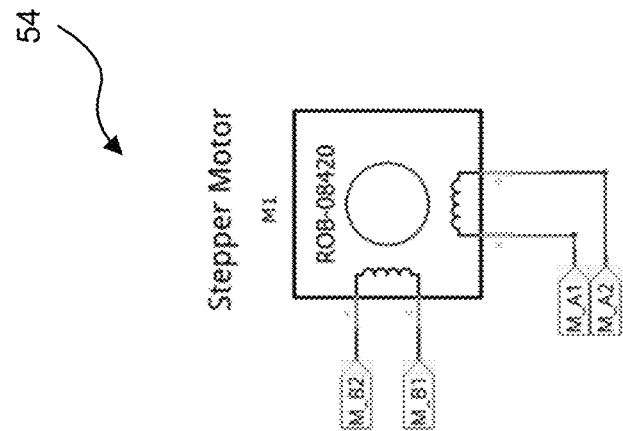
FIG. 12 is a circuit diagram of a stepper motor of the garden protection system, in one exemplary embodiment.
Figure 11:
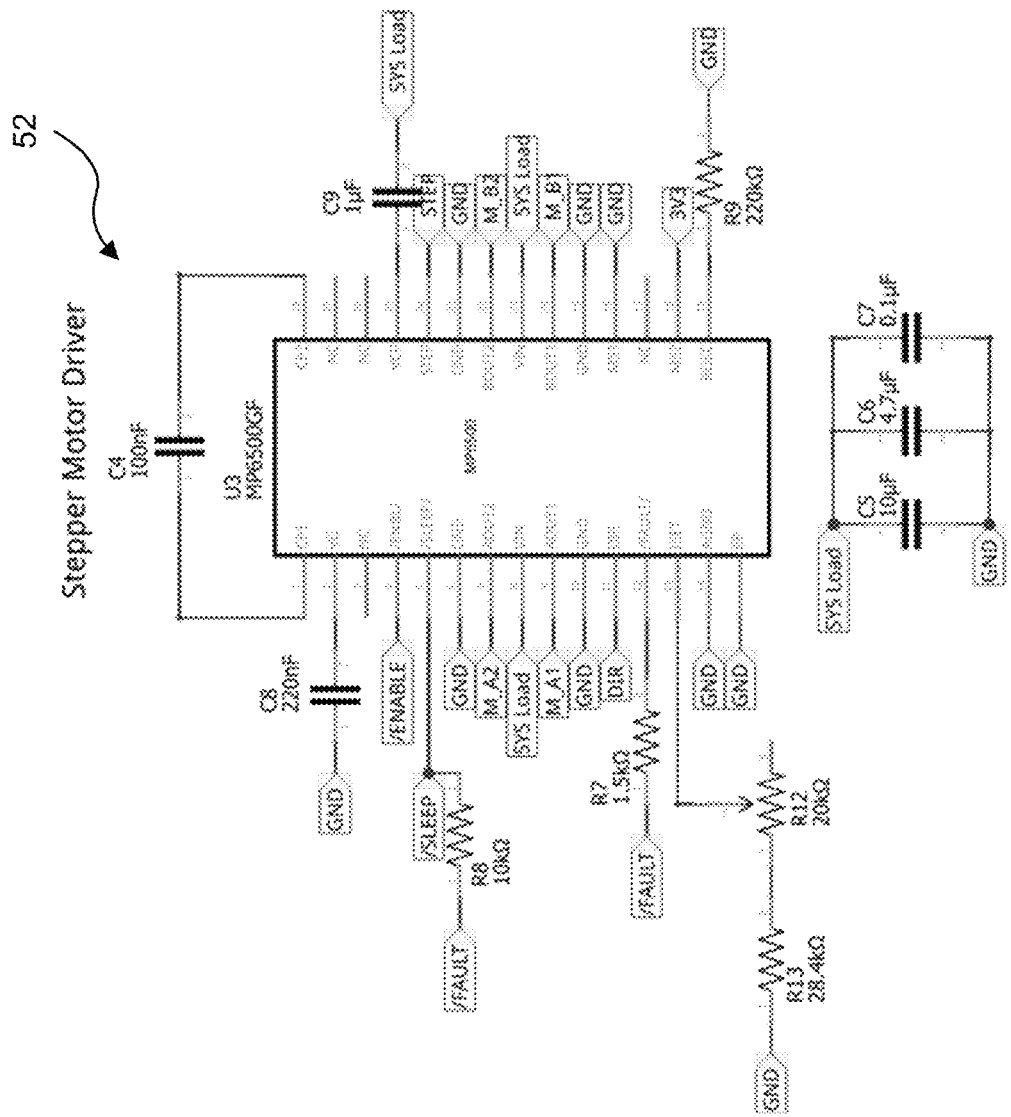
FIG. 11 is a circuit diagram of a stepper motor driver that may be used to drive a stepper motor of the garden protection system, in one exemplary embodiment.

FIG. 11 is an exemplary circuit diagram of a stepper motor driver 52 that may be used to drive a stepper motor 54 (i.e., illustrated in FIG. 12). The stepper motor 54 may be used to rotate the roller system 32 to roll the shade cloth 26 up and down along the frames of the garden protection system 10.

Figure 13:
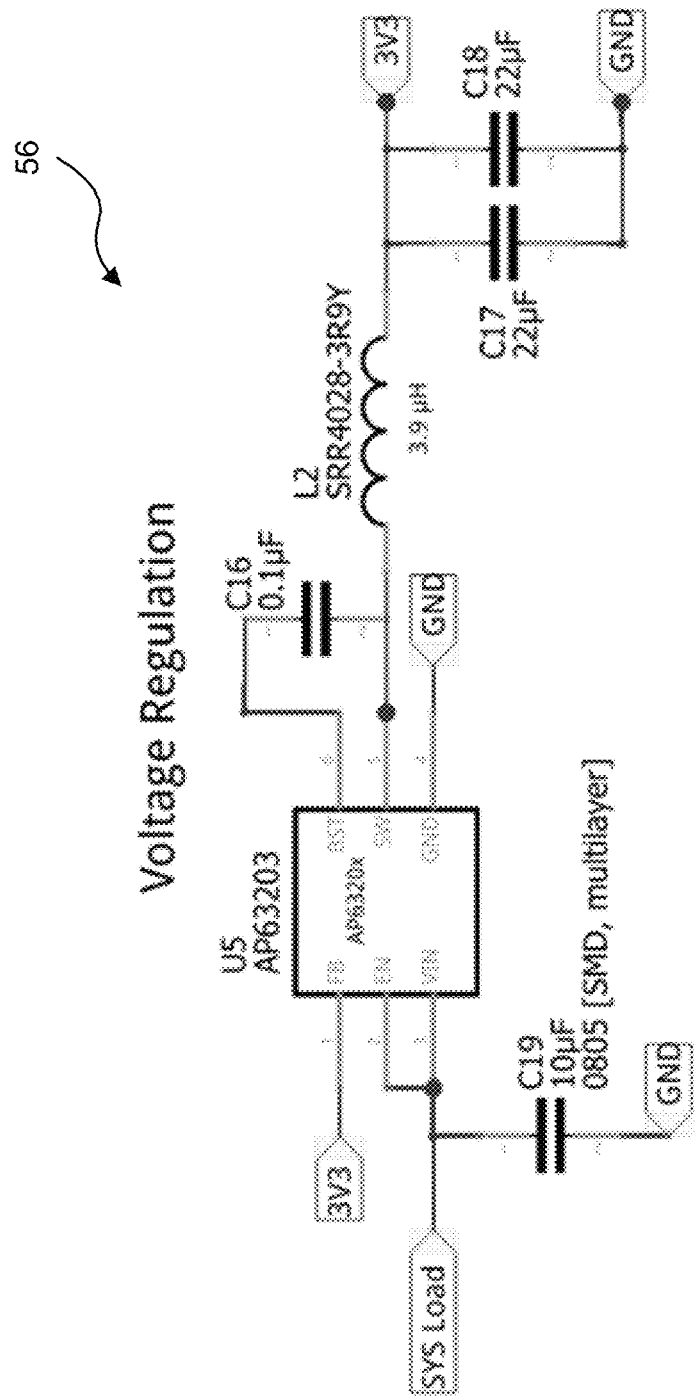
FIG. 13 is an exemplary circuit diagram of a voltage regulation system that is operable to regulate voltages to one or more the circuits of the garden protection system, in one exemplary embodiment.

FIG. 13 is an exemplary circuit diagram of a voltage regulation system 56 that is operable to regulate voltages to one or more the circuits of the garden protection system 10.

Figure 14:
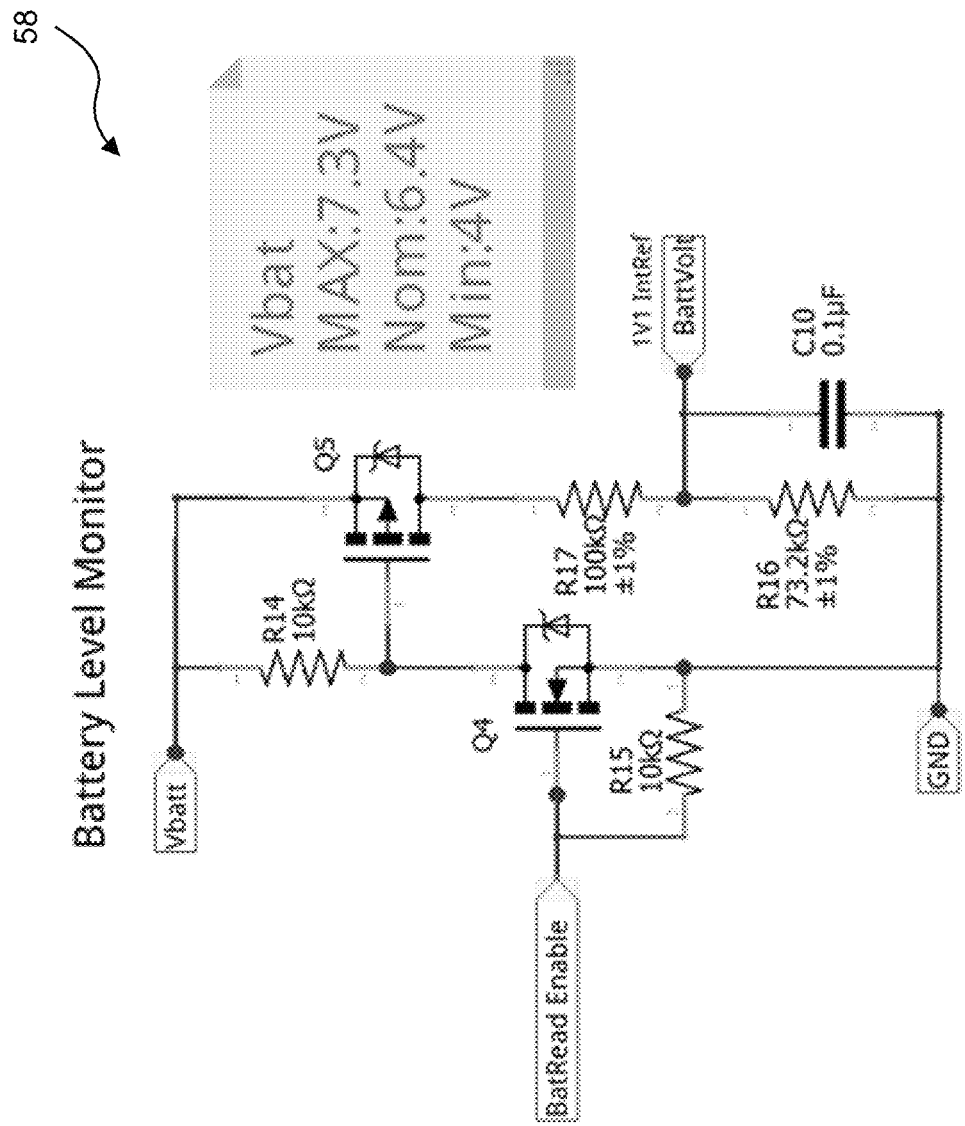
FIG. 14 is a circuit diagram of a battery level monitor, in one exemplary embodiment.

FIG. 14 is an exemplary circuit diagram of a battery level monitor 58 and is operable to monitor the amount of power that the battery of the garden protection system 10 is operable to provide. In some embodiments, the battery level monitor 58 may be operable to detect when the battery will soon no longer be operable to provide the necessary power to lower the shade cloth 26. In this regard, the battery level monitor 58 may provide an alert to the user and/or direct the shade cloth 26 to be automatically lowered so as to prevent inclement weather from harming the garden bed 18 after the battery level is incapable of providing the power necessary to lower the shade cloth 26.

Figure 15:
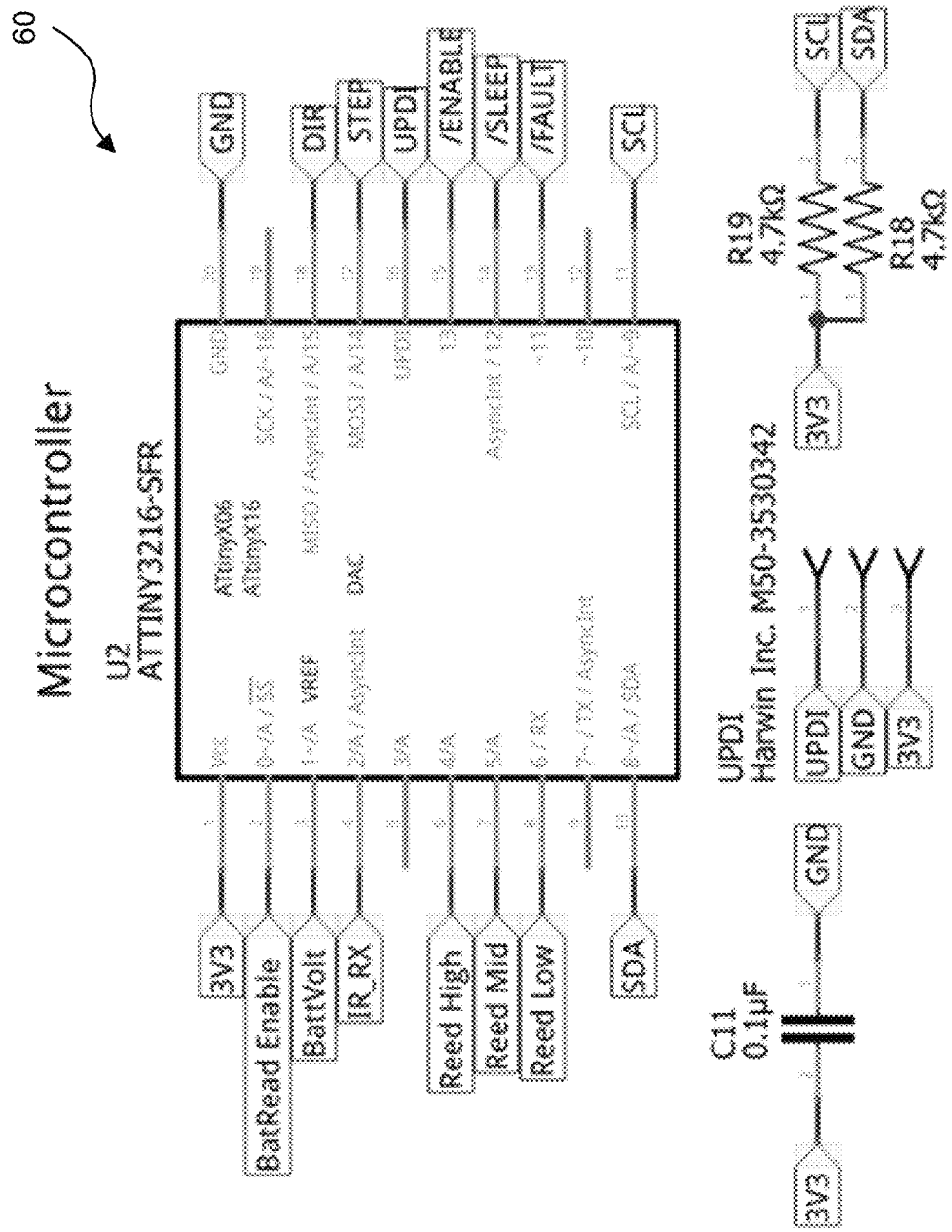
FIG. 15 is a microcontroller operable to control each of the components of the garden protection system, in one exemplary embodiment.

FIG. 15 is an exemplary microcontroller 60 that is operable to control each of the components of the garden protection system 10 (e.g., the motor, the solar powered battery charging system 50) and/or process data from each of the components of the garden protection system 10 (e.g., the moisture detector 36, the stepper motor driver 52, etc.).

Figure 16:
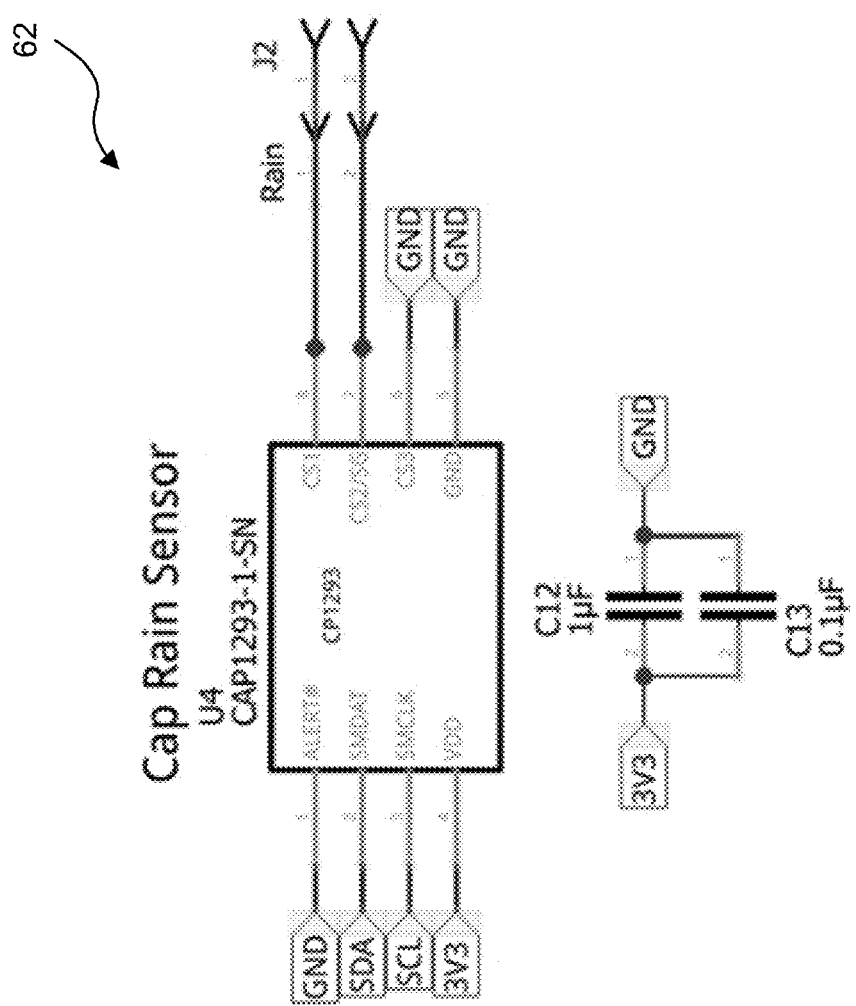
FIG. 16 is a circuit diagram of a capacitive rain sensor operable with the moisture detector, in one exemplary embodiment.

FIG. 16 is a circuit diagram of an exemplary capacitive rain sensor 62 that may be operable with the moisture detector 36.

Figure 17:
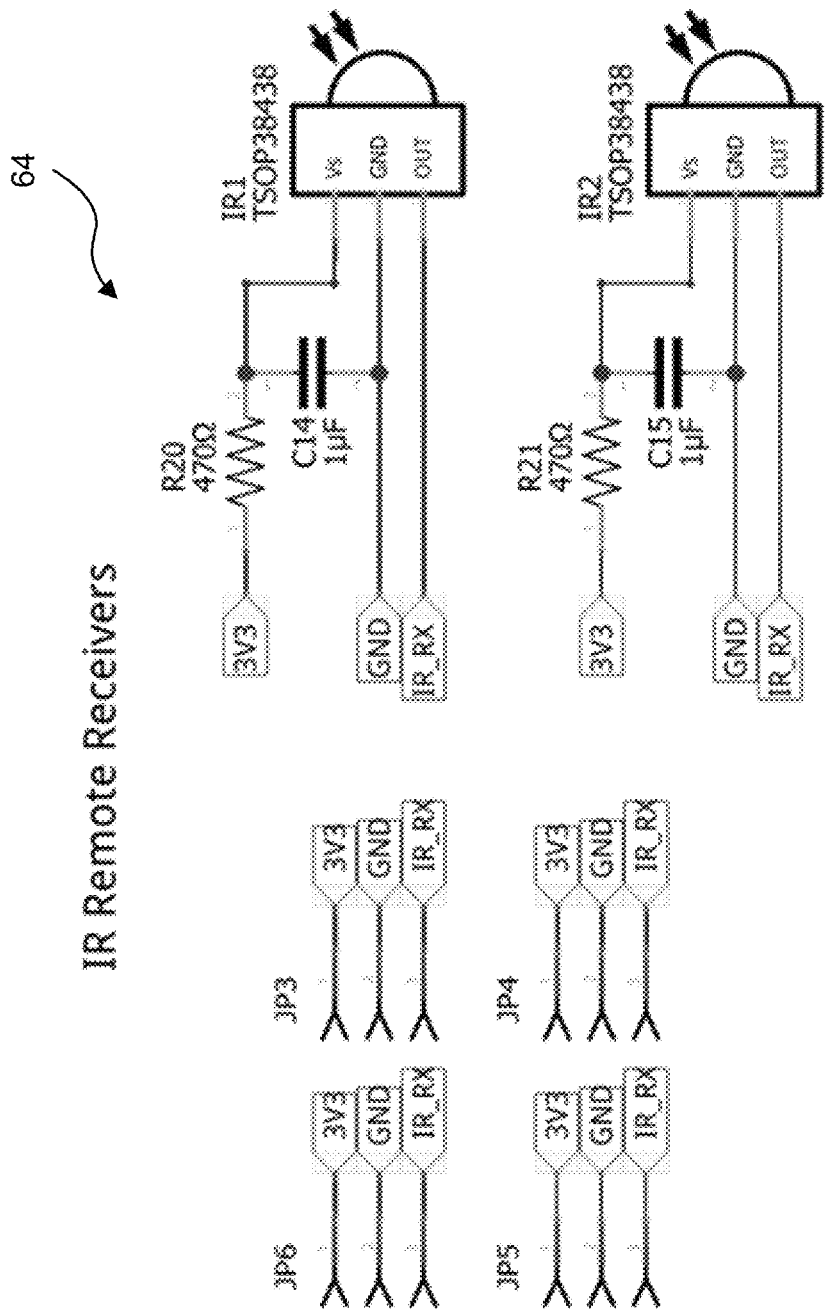
FIG. 17 are circuit diagrams of exemplary infrared remote receivers of the garden protection system, in one exemplary embodiment.

FIG. 17 are circuit diagrams of exemplary infrared remote receivers 64 (e.g., a communications module). For example, when a user is proximate to the garden protection system 10, the user may desire to provide shade to the garden bed 18. In this regard, the user may operate an infrared remote control that directs the garden protection system 10 via one or more of the infrared remote receivers 64 to activate the motor and roll down the shade cloth 26. Alternatively, when the user wishes to provide more sunlight to the garden bed 18, the user may operate the infrared remote control to direct the garden protection system 10 to activate the motor and roll up the shade cloth 26. However, the embodiments herein are not intended to be limited to just an infrared remote control of the garden protection system 10. Other embodiments of the garden protection system 10 may include other forms of remote control including Bluetooth signaling and Wi-Fi signaling such that the user may control the garden protection system 10 from a computer, a smart phone, a tablet computer, or the like.

Figure 18:
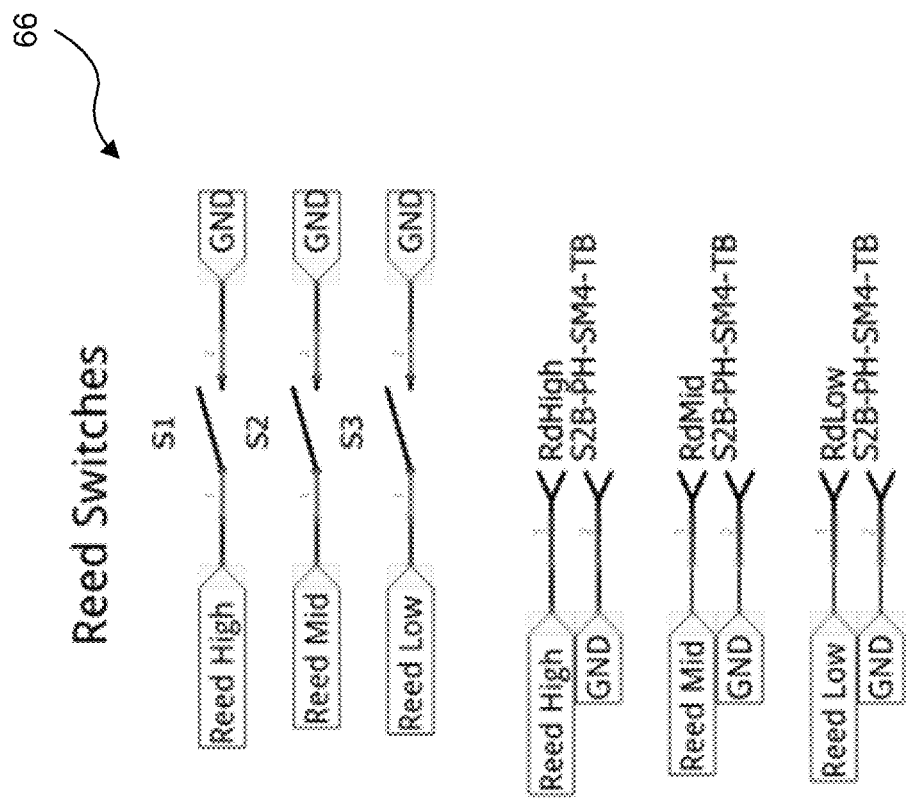
FIG. 18 are exemplary reed switches that may be implemented to control various aspects of the solar battery charging system, in one exemplary embodiment.

FIG. 18 are exemplary reed switches 66 that may be implemented to control various aspects of the solar battery charging system 50.

Figure 19:
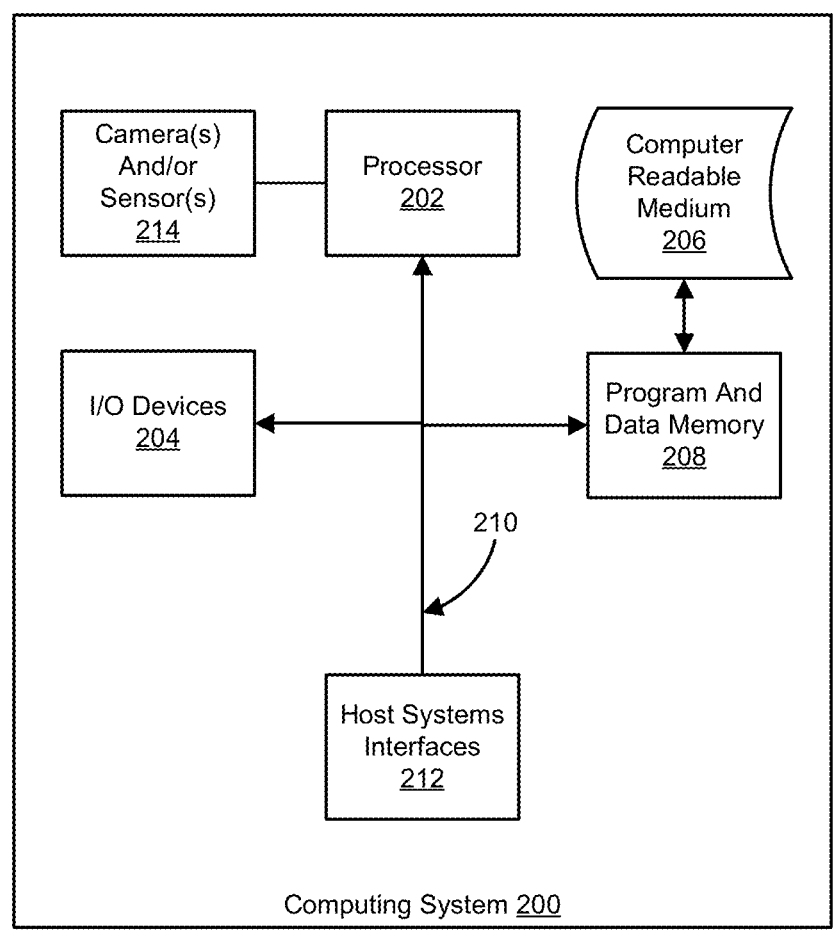
FIG. 19 is a block diagram of an exemplary computing system in which a computer readable medium provides instructions for performing one or more methods herein.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements. FIG. 19 illustrates a computing system 200 in which a computer readable medium 206 may provide instructions for performing any of the methods disclosed herein.

Furthermore, some aspects of the embodiments herein can take the form of a computer program product accessible from the computer readable medium 206 to provide program code for use by or in connection with a computer or any instruction execution system. For the purposes of this description, the computer readable medium 206 can be any apparatus that can tangibly store the program code for use by or in connection with the instruction execution system, apparatus, or device, including the computing system 200.

The computer readable medium 206 can be any tangible electronic, magnetic, optical, electromagnetic, infrared, or semiconductor system (or apparatus or device). Some examples of a computer readable medium 206 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 200 can include one or more processors 202 coupled directly or indirectly to memory 208 through a system bus 210. Additionally, the computing system 200 may have one or more cameras and/or sensors 214 coupled to the processor(s) 202 to perform in accordance with the embodiments disclosed hereinabove. The memory 208 can include local memory employed during actual execution of the program code, bulk storage, and/or cache memories, which provide temporary storage of at least some of the program code in order to reduce the number of times the code is retrieved from bulk storage during execution.

Input/output (I/O) devices 204 (including but not limited to keyboards, displays, pointing devices, I/O interfaces, etc.) can be coupled to the computing system 200 either directly or through intervening I/O controllers. Network adapters may also be coupled to the computing system 200 to enable the computing system 200 to couple to other data processing systems, such as through host systems interfaces 212, printers, and/or or storage devices through intervening private or public networks. Modems, cable modems, Ethernet cards, Wi-Fi components, and Bluetooth components are just a examples of network adapter types.

What is claimed is:

1. A garden protection system, comprising:
    a housing comprising a controller, a moisture detector, a motor, a pulley system, a temperature sensor, and a power supply, comprising: a power source and a solar panel;
    a rectangular garden box;
    a roller system comprising:
        first and second shade cloths, each shade cloth being made from a mesh material, and each shade cloth comprising a pocket along a first end of the shade cloth and attached to the pulley system at a second end of the shade cloth;
        two rods, a first rod being configured in the pocket of the first shade cloth and a second rod being configured in the pocket of the second shade cloth; and
        four brackets with each bracket comprising a roller, wherein a first and a second of the four brackets are mechanically fastened at opposing ends of the first rod, and a third and fourth of the four brackets are mechanically fastened at opposing ends of the second rod; and
    a frame comprising four legs, each leg comprising a joint and a roofing member,
    wherein a first pair of the legs forms a first end of the garden protection system and a second pair of the legs forms a second end of the garden protection system,
    wherein the first pair of legs is attached to a first end of the garden box and the second pair of legs is attached to a second opposing end of the garden box,
    wherein the housing is attached to each of the roofing members at a top of the garden protection system,
    wherein each bracket is rollably attached to a respective leg of the garden protection system,
    wherein the moisture detector and the temperature sensor are operable to detect inclement weather and to send a control signal to the controller, which, in turn, automatically directs the motor to activate and rotate the pulley system to roll out the first shade cloth from the housing down a first side of the garden protection system via the first and second brackets, and to roll out the second shade cloth from the housing down a second side of the garden protection system via the third and fourth brackets,
    wherein, when the inclement weather subsides, the moisture detector and the temperature sensor are operable to send another control signal to the controller, which, in turn, automatically directs the motor to activate and rotate the pulley system in an opposite manner to roll up the first shade cloth to the housing along the first side of the garden protection system via the first and second brackets, and to roll up the second shade cloth to the housing along a second side of the garden protection system via the third and fourth brackets, and
    wherein the garden protection system further comprises a battery level monitor to provide an alert to a user and to direct the shade cloths to be automatically lowered before a battery level is incapable of providing power necessary to lower the shade cloths.

* * * * *